United States Patent
Matsuo (10) Patent No.: US 11,269,489 B2
(45) Date of Patent: Mar. 8, 2022

(54) DOCUMENT PROCESSING SYSTEM AND NON-TRANSITORY COMPUTER READABLE MEDIUM STORING DOCUMENT PROCESSING PROGRAM

(71) Applicant: FUJIFILM Business Innovation Corp., Tokyo (JP)

(72) Inventor: Takenori Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 233 days.

(21) Appl. No.: 16/171,388

(22) Filed: Oct. 26, 2018

(65) Prior Publication Data

US 2019/0129584 A1 May 2, 2019

(30) Foreign Application Priority Data

Nov. 2, 2017 (JP) .............................. JP2017-212551

(51) Int. Cl.
*G06F 3/0482* (2013.01)
*G06F 3/147* (2006.01)
(Continued)

(52) U.S. Cl.
CPC ............ *G06F 3/0482* (2013.01); *G06F 3/147* (2013.01); *G06F 40/106* (2020.01); *G06F 40/169* (2020.01)

(58) Field of Classification Search
CPC .... G06F 40/106; G06F 40/169; G06F 3/0482; G06F 3/147; G06F 3/0483;
(Continued)

(56) References Cited

U.S. PATENT DOCUMENTS

2006/0238652 A1* 10/2006 Parker .................... H04L 41/22
348/564
2007/0208994 A1* 9/2007 Reddel ................. G06F 40/197
715/205
2007/0234235 A1 10/2007 Scott
(Continued)

FOREIGN PATENT DOCUMENTS

JP 2005136808 5/2005
JP 2016051427 4/2016

OTHER PUBLICATIONS

Fuji Xerox Co., Ltd., "DocuWorks 8," accessed Apr. 2018, Available at: http://www.fujixerox.co.jp/product/catalog/pdf/docuworks8_1307_7.pdf.
(Continued)

*Primary Examiner* — Chau T Nguyen
(74) *Attorney, Agent, or Firm* — JCIPRNET (57) ABSTRACT

A document processing system includes a first device capable of executing a document processing application, the first device including a first display control unit that controls a first display unit so as to display an electronic document to be processed and plural object attachment buttons, to which attachment commands of plural types of objects attachable to the electronic document are respectively assigned, in the document processing application, and a second device capable of executing the document processing application, the second device including a second display control unit that controls a second display unit having a size smaller than a size of the first display unit so as to display an electronic document to be processed and selection object attachment button to which attachment commands of selection objects, which is an object selected by a user among the plural types of objects corresponding to the plural object attachment buttons, are assigned.

8 Claims, 8 Drawing Sheets

(51) Int. Cl.
*G06F 40/106* (2020.01)
*G06F 40/169* (2020.01)

(58) Field of Classification Search
CPC .... G06F 3/04847; G06F 8/38; G06F 9/44505; G06F 9/451; H04N 1/00413; H04N 1/00474; H04N 1/00503; H04N 1/00514
See application file for complete search history.

(56) References Cited

U.S. PATENT DOCUMENTS

| | | | | |
|---|---|---|---|---|
| 2012/0017178 | A1* | 1/2012 | Mulloy | G06F 3/0486 715/835 |
| 2012/0096345 | A1* | 4/2012 | Ho | G06F 3/04883 715/252 |
| 2014/0026058 | A1* | 1/2014 | Jao | H04L 41/22 715/736 |
| 2014/0214988 | A1* | 7/2014 | Nicolaou | G06F 15/16 709/206 |
| 2014/0337752 | A1* | 11/2014 | Cammarata | G06F 3/04817 715/744 |
| 2015/0370757 | A1 | 12/2015 | Duns et al. | |
| 2016/0062575 | A1 | 3/2016 | Yamamichi | |
| 2016/0117301 | A1* | 4/2016 | Chan | G06F 40/169 715/753 |
| 2016/0162128 | A1* | 6/2016 | Hansen | G06F 3/0482 715/747 |
| 2016/0196048 | A1* | 7/2016 | Khoury | G06F 3/1423 715/761 |
| 2017/0046321 | A1* | 2/2017 | Biran | G06F 40/169 |
| 2017/0220538 | A1* | 8/2017 | Hatfield | G06F 40/169 |
| 2017/0351537 | A1* | 12/2017 | AbiEzzi | G06F 9/452 |
| 2018/0373378 | A1* | 12/2018 | Cherian | G06F 3/0482 |

OTHER PUBLICATIONS

"Office Action of Japan Counterpart Application", dated Aug. 3, 2021, with English translation thereof, p. 1-p. 5.

* cited by examiner

DOCUMENT PROCESSING SYSTEM AND NON-TRANSITORY COMPUTER READABLE MEDIUM STORING DOCUMENT PROCESSING PROGRAM

CROSS-REFERENCE TO RELATED APPLICATIONS

This application is based on and claims priority under 35 USC 119 from Japanese Patent Application No. 2017-212551 filed Nov. 2, 2017.

BACKGROUND (i) Technical Field

The present invention relates to a document processing system and a non-transitory computer readable medium storing a document processing program.

(ii) Related Art

In the related art, various document processing applications for performing a process (editing or managing) on an electronic document are known. Particularly, a document processing application capable of attaching plural types of objects (for example, stamp, tags, and the like) to the electronic document to be processed is known. For example, DocuWorks 8, Fuji Xerox, "http://www.fujixerox.co.jp/product/catalog/pdf/docuworks8_1307_7.pdf" disclosures a document processing application capable of attaching plural types of objects to the electronic document, in a sense of handing paper documents which are actually lined up on a desk.

In addition, in the related art, in some cases, a display screen of the document processing application displays a plurality of object attachment buttons to which a command for attaching each of the plural types of objects to the electronic document to be processed is assigned. Also in some cases, a user may freely customize a plurality of objects corresponding to the plurality of object attachment buttons. For example, JP2016-51427A discloses a document processing application which displays an object attachment button to which a command for attaching an object is assigned. In the document processing application, the user may more appropriately customize the command for attaching the object assigned to the object attachment button.

SUMMARY

In some cases, a user may use a document processing application in a plurality of devices. As an example, in some cases, the user executes the document processing application on a personal computer and performs a process on an electronic document to be processed. The document processing application is executed on a mobile terminal so as to process the electronic document even while the user is out.

Here, there may be a difference in performance between the plurality of devices which execute the document processing application. The difference in the performance of the devices includes a difference in screen sizes of display units and a difference in types of objects attachable by the document processing application. The difference in types of objects attachable by the document processing application may be, for example, due to a difference in operation systems (OSs) of the devices.

In some cases, the document application may be executed by a first device and a second device having lower performance than the first device. In a case where all of a plurality of object attachment buttons displayed on a display screen (simply referred to as "display screen of first device" and same also applies to second device) of the document processing application in the first device are displayed on a display screen of the second device, the user may not comfortably use the document processing application in the second device due to the difference in performance between the first device and the second device.

First, in a case where a screen size of a display unit of the second device is smaller than a screen size of a display unit of the first device, the user may not comfortably use the document processing application in the second device. In detail, in the first device, since the display screen is wide, even in a case of displaying the plurality of object attachment buttons, it is possible to secure a sufficiently wide document display area (area on which electronic document to be processed is displayed) and to obtain visibility of the electronic document. However, in the second device, in the case where all of the plurality of object attachment buttons are displayed, due to the narrow display screen, the document display area is pressed down or the plurality of object attachment buttons overlap with one another in the electronic document to be processed, so that the visibility of the electronic document may be deteriorated.

Secondly, in a case where the document processing application is executed by the second device, a function of the document processing application is limited. In a case (that is, case where there are types of objects attachable in the first device and not attachable in the second device) where types of the objects attachable to the electronic document to be processed in the document application executed by the second device are smaller than types of objects attachable to the electronic document to be processed in the document processing application executed by the first device, the user may not comfortably use the document processing application in the second device. In detail, in a case where all of the object attachment buttons displayed on the display screen of the first device are displayed on the display screen of the second device, the object attachment button corresponding to the object of the type not attachable to the electronic document to be processed may be displayed in the document processing application executed by the second device. In this case, even in a case where the user selects the object attachment button corresponding to the object of the type not attachable by the second device, since the user may not attach the intended object, the user is confused.

Accordingly, it is conceivable to display some of the plurality of object attachment buttons displayed on the display screen of the first device, on the display screen of the second device. However, instead of simply reducing the number of displayed object attachment buttons, it is desirable to display a selection object attachment button to which an attachment command of a selection object selected according to a request of the user is assigned on the display screen of the second device, among a plurality of types of objects corresponding to the plurality of object attachment buttons displayed on the display screen of the first device.

Aspects of non-limiting embodiments of the present disclosure relate to a technique of, in a case of executing a document processing application in a second device having lower performance than a first device capable of executing the document processing application, displaying a selection object attachment button to which an attachment command of a selection object selected according to performance of the second device and a request of a user among a plurality of types of objects corresponding to a plurality of object attachment buttons displayed on the first device is assigned.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided a document processing system including: a first device capable of executing a document processing application, the first device including a first display control unit that controls a first display unit so as to display an electronic document to be processed and a plurality of object attachment buttons, to which attachment commands of a plurality of types of objects attachable to the electronic document are respectively assigned, in the document processing application; and a second device capable of executing the document processing application, the second device including a second display control unit that controls a second display unit having a size smaller than a size of the first display unit so as to display an electronic document to be processed and selection object attachment button to which attachment commands of selection objects, which is an object selected by a user among the plurality of types of objects corresponding to the plurality of object attachment buttons, are assigned.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described.

First Exemplary Embodiment

Figure 1:
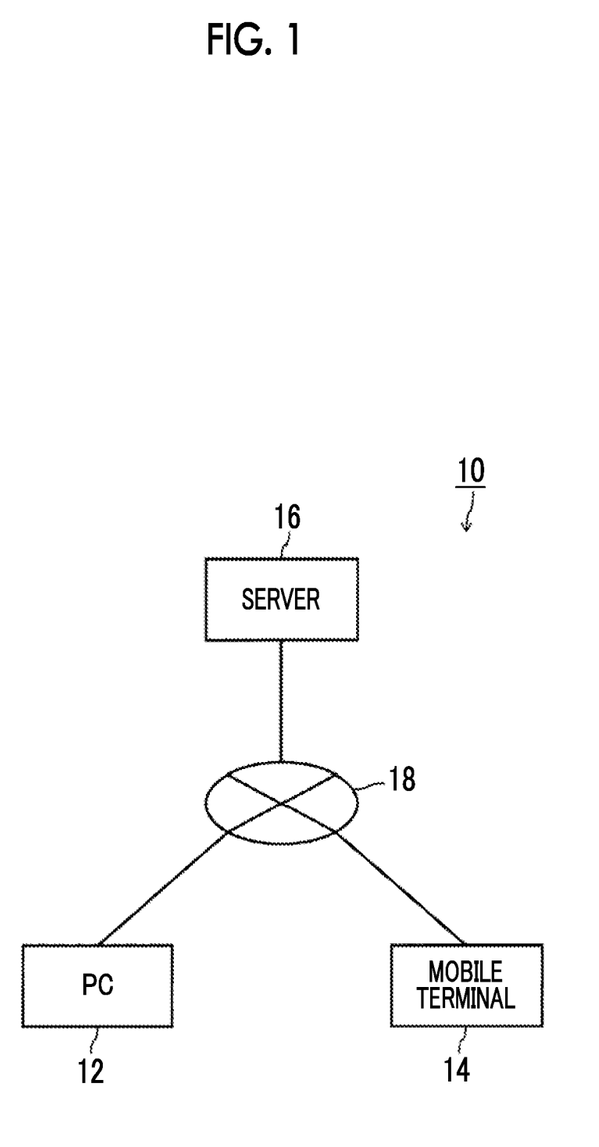
FIG. 1 is a schematic diagram illustrating a configuration of a document processing system according to the present exemplary embodiment.

FIG. 1 is a schematic diagram illustrating a configuration of a document processing system 10 according to the first exemplary embodiment. The document processing system 10 is configured to include a personal computer (PC) 12 as a first device or another device, a mobile terminal 14 as a second device or a document processing device, and a server 16 configured with a computer. The PC 12, the mobile terminal 14, and the server 16 are connected to communicate with one another via a communication line 18 including a local area network (LAN) or the internet and the like. The PC 12 and the mobile terminal 14 may be directly communicable with each other in a wired or wireless manner. In this case, it is not necessary for the document processing system 10 to include the server 16.

In addition, in the first exemplary embodiment, the PC 12 is used as the first device and the mobile terminal 14 is used as the second device, but another device may be used as the first device or the second device. In the first exemplary embodiment, the first device and the second device may execute a document processing application described below and as long as a size of a display unit of the second device is smaller than a size of a display unit of the first device, various devices may be used.

Figure 2:
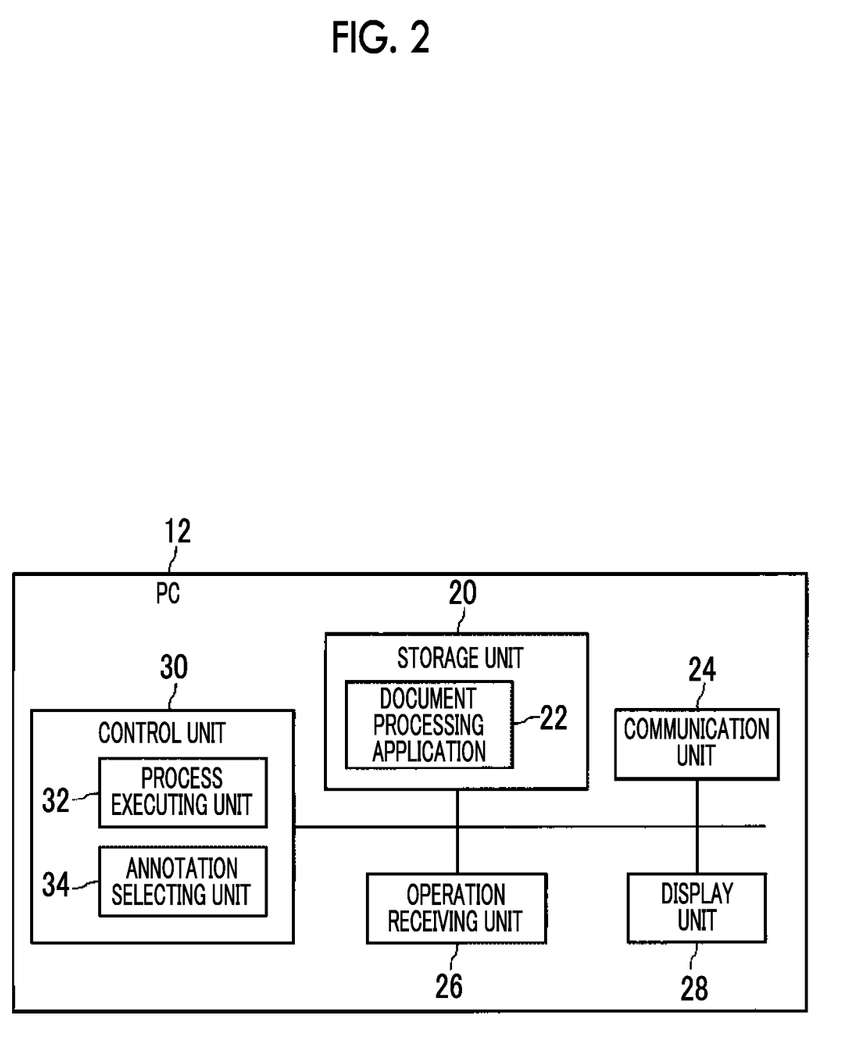
FIG. 2 is a schematic diagram illustrating a configuration of a PC.

FIG. 2 is a schematic diagram illustrating a configuration of the PC 12.

A storage unit 20 is configured to include, for example, a hard disc, a read only memory (ROM), a random access memory (RAM), or the like. The storage unit 20 stores an electronic document as a processing target, a processing result by the PC 12, and the like. In addition, a document processing application 22 which performs a process on the electronic document, is installed in the PC 12 and therefore the document processing application 22 is stored in the storage unit 20. Details of the document processing application 22 will be described below. Further, the storage unit 20 stores a program for executing the document processing application 22 and operating each of units of the PC 12.

A communication unit 24 is configured to include, for example, a network adapter, a Lightning (registered trademark) interface, a universal serial bus (USB) interface, a Bluetooth (registered trademark) interface, or the like. The communication unit 24 functions to communicate with the mobile terminal 14 and the server 16 via the communication line 18. Alternately, the communication unit 24 functions as an interface for directly connecting with the mobile terminal 14. Accordingly, for example, it is possible to transmit the electronic document or the like already processed by the document processing application 22, to the server 16 or the mobile terminal 14.

An operation receiving unit 26 is configured to include, for example, a mouse or a keyboard. The operation receiving unit 26 receives an operation for inputting a command from a user to the PC 12, particularly, a command to the document processing application 22 executed in the PC 12.

A display unit 28 as a first display unit is configured to include, for example, a liquid crystal panel. The display unit 28 displays various screens, particularly, a display screen of the document processing application 22. A screen size of the display unit 28 is larger than a screen size of a display unit (described below) of the mobile terminal 14.

A control unit 30 is configured to include, for example, a central processing unit (CPU). The control unit 30 controls each of the units of the PC 12 according to the program stored in the storage unit 20. In addition, by executing the installed document processing application 22, the control unit 30 functions as a process executing unit 32 and an annotation selecting unit 34.

The process executing unit 32 performs a process of executing the document processing application 22. Specifically, the process executing unit 32 performs a process of causing the display unit 28 to display the display screen (hereinafter, simply referred to as "display screen of PC 12") of the document processing application 22. In this way, the process executing unit 32 also functions as a first display control unit. In addition, in the document processing application 22 executed in the PC 12, the process executing unit 32 displays a plurality of annotation attachment buttons as a plurality of object attachment buttons on the display screen of the PC 12, the annotation attachment button being assigned with an attachment command of each of plural types of annotations attachable to the electronic document to be processed.

An annotation is an object which is attached to the electronic document to be processed. The document processing application 22 may process the electronic document to be processed as a layer configuration including a plurality of layers. For example, a main body of the electronic document is disposed on a layer 1 and the annotation attached by the document processing application 22 is disposed on a layer 2 which is a layer different from the main body of the electronic document. Therefore, the annotation may be referred to as an object disposed (attached) on a layer different from the main body of the electronic document.

The process executing unit 32 executes each of functions which may be executed by the document processing application 22 according to an operation of the user received by the operation receiving unit 26. Particularly, in a case where the user selects any one of the plurality of annotation attachment buttons displayed on the display screen of the PC 12, the process executing unit 32 executes a process of attaching the annotation corresponding to the selected annotation attachment button, to the electronic document to be processed. In this way, the process executing unit 32 also functions as a first object attachment unit.

The annotation selecting unit 34 selects some types of annotations among the plural types of annotations corresponding to the plurality of annotation attachment buttons displayed on the display unit 28. The annotation selected in this way is referred to as a selection annotation. In a case where the same document processing application as the document processing application 22 is executed in the mobile terminal 14, the selection annotation attachment button (described below), to which the selection annotation is assigned, is displayed on the display screen of the document processing application. The annotation selecting unit 34 selects the selection annotation according to an instruction of the user.

Hereinafter, the details of the document processing application 22 and details of processes executed by the process executing unit 32 and the annotation selecting unit 34 will be described.

Figure 3:
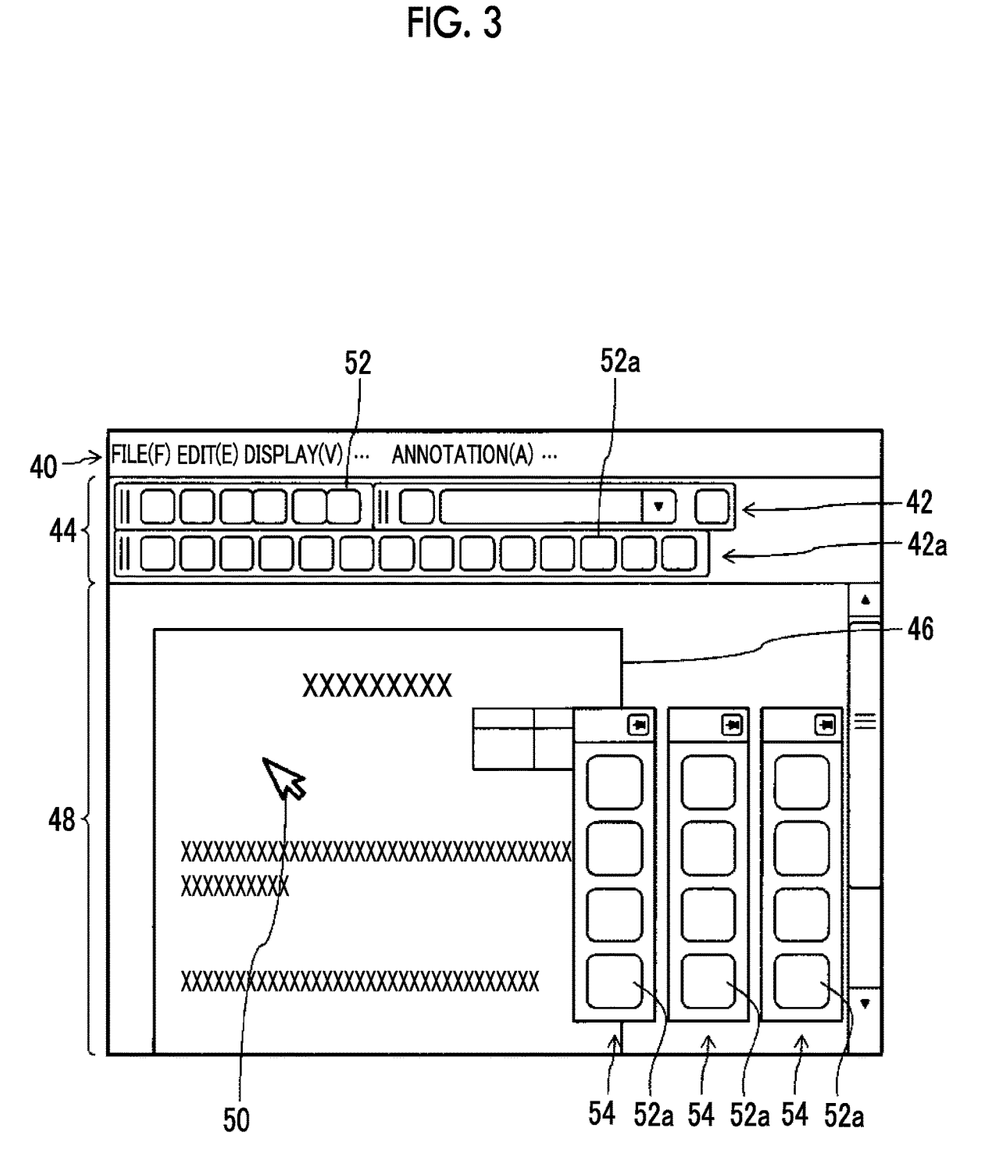
FIG. 3 is a diagram illustrating an example of a display screen of a document processing application displayed on a display unit of the PC.

FIG. 3 is a diagram illustrating an example of the display screen of the PC 12. The display screen of the PC 12 is configured to include a tool bar area 44 on which a menu bar 40 and one or a plurality of tool bars 42 are displayed, and a document display area 48 on which an electronic document 46 to be processed is displayed. The display screen of the PC 12 may include an area other than each of the areas described above, for example, a folder area or the like on which a folder tree of the PC 12 is displayed. In addition, a size of each of the areas may be changeable by the user.

A cursor 50 moving on a screen according to an operation of the operation receiving unit 26 by the user, is displayed on the display screen of the PC 12. Specifically, a position of the cursor 50 is changed by an operation or the like of a mouse.

The menu bar 40 includes a main menu in which major items such as "file", "edit", "display", and the like are included. In a case of focusing the cursor 50 on each of the major items and selecting the major item (realized by, for example, left clicking of mouse), the detailed command is displayed on a drop-down list. By selecting the displayed detail command, the user may input the command to the document processing application 22.

The tool bar 42 is an area in a belt shape including a button 52 in an icon shape to which the command for executing each of functions which may be executed by the document processing application 22 executed in the PC 12, is assigned. As an example, the tool bar 42 is provided to correspond to the major item of the menu bar 40.

That is, each of the commands included in one major item is assigned to each of the buttons 52 included in one tool bar 42. For example, the button 52 corresponding to "open file (electronic document)", "save", or the like which is the command selectable by the major item of "file" is included in the tool bar 42 corresponding to the major item of "file". Alternatively, the tool bar 42 including a plurality of buttons 52, to which a plurality of commands freely selected by the user among a plurality of the major items are assigned, may be displayed.

Among the plurality of tool bars 42 displayed on the tool bar area 44, there is an annotation tool bar 42a used for attaching the plural types of annotations to the electronic document 46. The annotation tool bar 42a includes a plurality of annotation attachment buttons 52a to which the attachment command for attaching each of the plural types of annotations to the electronic document 46, is assigned. Although not illustrated in FIG. 3, an icon (symbol) indicating the corresponding annotation is attached to each of the annotation attachment buttons 52a.

For example, the plural types of annotations are classified into categories such as a basic annotation, a stamp annotation, and a figure annotation. The plural types of annotations are respectively classified into each of the categories. For example, the basic annotation includes various types of annotations such as a text and a tag, the stamp annotation includes various types of annotations such as importance, approval, circulation, confidentiality, checking, done, and the like, and the figure annotation includes various types of annotations such as a rectangle, a circle, a straight line, a cloud shape, and the like.

By selecting any one of the annotation attachment buttons 52a included in the annotation tool bar 42a and by designating a position to which the annotation is attached in the document display area 48 using the cursor 50, the user may attach the annotation to the designated position. In this way, the document processing application 22 becomes able to attach the plural types of annotations to the electronic document 46.

In addition, as illustrated in FIG. 3, the process executing unit 32 may display one or the plurality of annotation attachment buttons 52a on the document display area 48. In the present exemplary embodiment, it is possible to display a tool box 54 including the annotation attachment button 52a on the document display area 48. In the present exemplary embodiment, the tool box 54 including the plurality of annotation attachment buttons 52a may be displayed on the document display area 48, but the method of displaying the annotation attachment button 52a is not limited thereto.

In addition, as illustrated in FIG. 3, in the present exemplary embodiment, a plurality of tool boxes 54 are displayed on the document display area 48. In the present exemplary embodiment, each of the tool boxes 54 corresponds to each of the categories of the annotations. For example, the first tool box 54 includes the annotation attachment buttons 52a corresponding to various annotations of the basic annotation, the second tool box 54 includes the annotation attachment buttons 52a corresponding to various annotations of the stamp annotation, the third tool box 54 includes the annotation attachment buttons 52*a* corresponding to various annotations of the figure annotation. An icon (symbol) indicating the corresponding annotation is included in each of the annotation attachment buttons 52*a* included in the tool box 54.

The annotation corresponding to the annotation attachment button 52*a* included in each of the tool boxes 54 may be freely selected (customized) by the user. Accordingly, for example, it is possible to associate the annotation frequently used by the user with the annotation attachment button 52*a*.

In a case where the annotation attachment button 52*a* is displayed on the document display area 48, further in a case of selecting the annotation to be attached to the electronic document 46 and designating the attachment position, it is possible to reduce the amount of movement of the cursor 50 as compared with a case of using the annotation attachment button 52*a* included in the annotation tool bar 42*a* disposed on the tool bar area 44. That is, it is possible to perform the process with the simpler operation. In addition, by display the tool box 54 including the plurality of annotation attachment buttons 52*a* corresponding to a plurality of annotations in the vicinity of the electronic document 46, the user may perform the annotation attachment process in a sense (operation feeling) of writing or imprinting on a paper document in a state where a pencil case containing various writing tools and the like is placed beside the paper document, in the real world.

Figure 4:
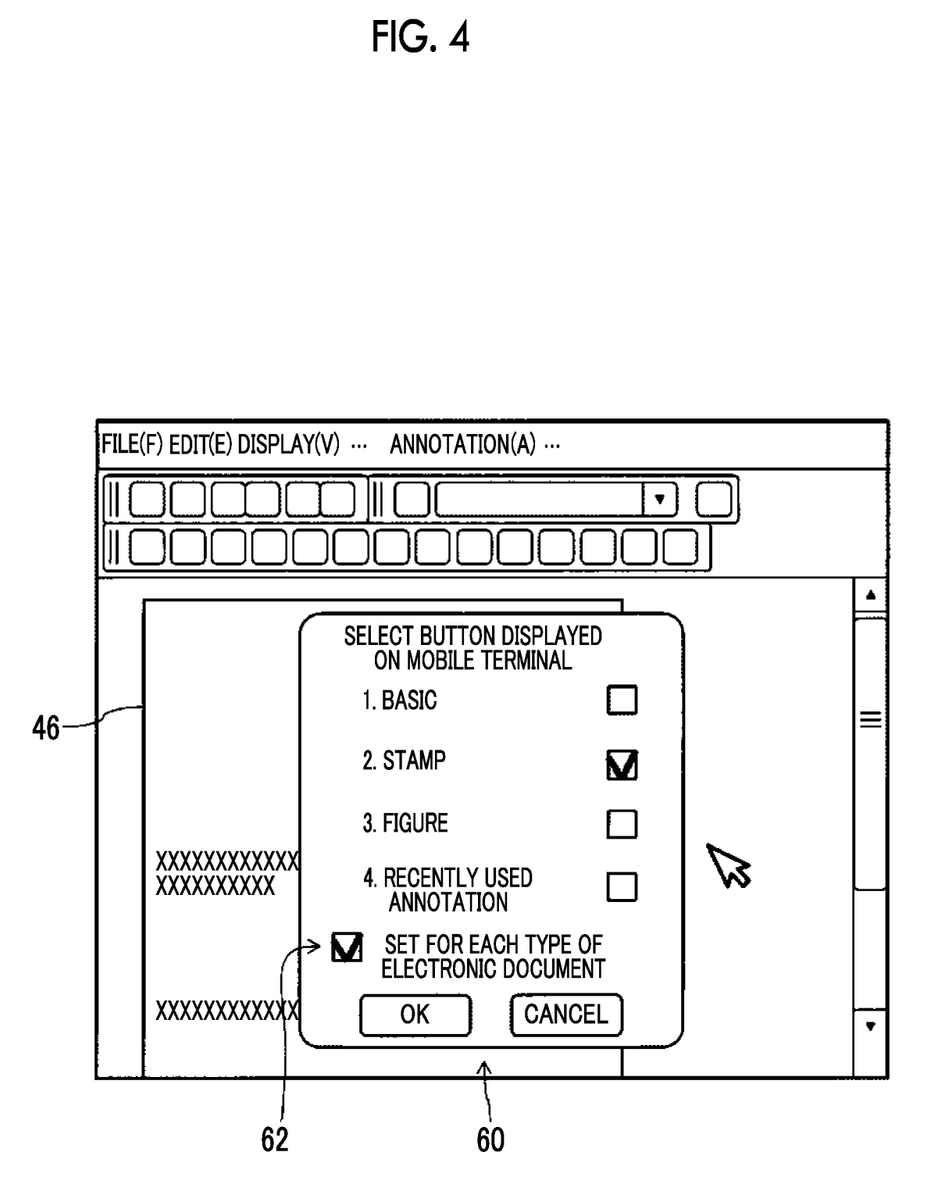
FIG. 4 is a diagram illustrating an example of a screen for selecting a selection object corresponding to a selection object attachment button displayed on a display unit of a mobile terminal.

FIG. 4 is a diagram illustrating an example of a screen for selecting the selection annotation. By performing a predetermined operation, the user may display a selection window 60 for selecting the selection annotation, on the display screen of the PC 12. The plural types of annotations attachable to the electronic document 46 by the document processing application 22 executed in the PC 12, are displayed on the selection window 60. The user selects some types of annotations as the selection annotation among plural types of displayed annotations. As described above, or as described below in detail, in a case where the same document processing application as the document processing application 22 is executed in the mobile terminal 14, the selection annotation is an annotation corresponding to the selection annotation attachment button displayed on the display screen of the document processing application executed in the mobile terminal 14.

In the present exemplary embodiment, the categories of the plurality of annotations corresponding to the plurality of tool boxes 54 displayed on the display screen of the PC 12, are displayed on the selection window 60 and the user selects the category of some annotations among the categories. In the example in FIG. 4, by inputting a check into a check box displayed beside the category of each of the annotations, the category may be selected. In the present exemplary embodiment, since each of the tool boxes 54 corresponds to each of the categories, selecting the category of the annotation in the selection window 60 means selecting some of the tool boxes 54 among the plurality of tool boxes 54 displayed on the display screen of the PC 12.

In addition, in the selection window 60, the user may select the annotation which the user recently uses (attaches) in the document processing application 22 executed in the PC 12 as the selection annotation. The recently used annotations (here, N annotations) include annotations from the annotation attached to the previous electronic document 46 to the annotation attached to the electronic document 46 before N times, based on the current time. Each time the attachment command of the annotation is received by the user, the document processing application 22 stores the annotation in the storage unit 20 as the recently used annotation. Only a certain number of recently used annotations are stored, and in a case where the number of annotations equal to or larger than the certain number are attached, the recently used annotations stored in the storage unit 20 is updated in a first in first out (FIFO) manner.

In addition, in the selection window 60, the selection annotation may be selected for each type of the electronic documents 46. In the example in FIG. 4, in a case of checking a check box 62 included in the selection window 60, the selection annotation selected in the selection window 60 is applied to only the type of the electronic document 46 which is the current processing target.

Examples of types of the electronic documents include a diagram, a contract, an explanatory material, a report, an application form, a minute book, a statement, and the like.

The method described above is an example of the method of selecting the selection annotation for each type of the electronic documents 46, but the selection annotation may be selected for each type of the electronic document 46 by using another method.

Further, in the selection window 60, the selection annotation also may be individually selected for each of the electronic documents 46. As the method of individually selecting the selection annotation for each of the electronic documents 46, for example, a method of applying the selection annotation selected in the selection window 60 to only the electronic document 46 which is the current processing target in a case of checking the check box included in the selection window 60, may be used.

In a case where the user selects the selection annotation and presses an OK button in the selection window 60, the annotation selecting unit 34 transmits user identification information (here, obtained by PC 12 executing user authentication) indicating the user and selection annotation information indicating the selection annotation selected by the user to the server 16. In a case where the recently used annotation is selected in the selection window 60, the user identification information and the selection annotation information indicating a plurality of recently used annotations stored in the storage unit 20 are transmitted to the server 16.

In a case of selecting the selection annotation for each type of the electronic documents 46, the annotation selecting unit 34 transmits the user identification information and the selection annotation information indicating a combination of the type of the electronic document and the selection annotation, to the server 16. In addition, in a case of individually selecting the selection annotation for each of the electronic documents 46, the annotation selecting unit 34 transmits the user identification information and the selection annotation information indicating a combination of identification information of the electronic document and the selection annotation, to the server 16.

The server 16 stores the received identification information and the received selection annotation information in association with each other. That is, the server 16 manages the selection annotation information for each of the users. In addition, in a case where the document processing system 10 does not include the server 16, the annotation selecting unit 34 stores the user identification information and the selection annotation information in association with each other, in the storage unit 20.

Figure 5:
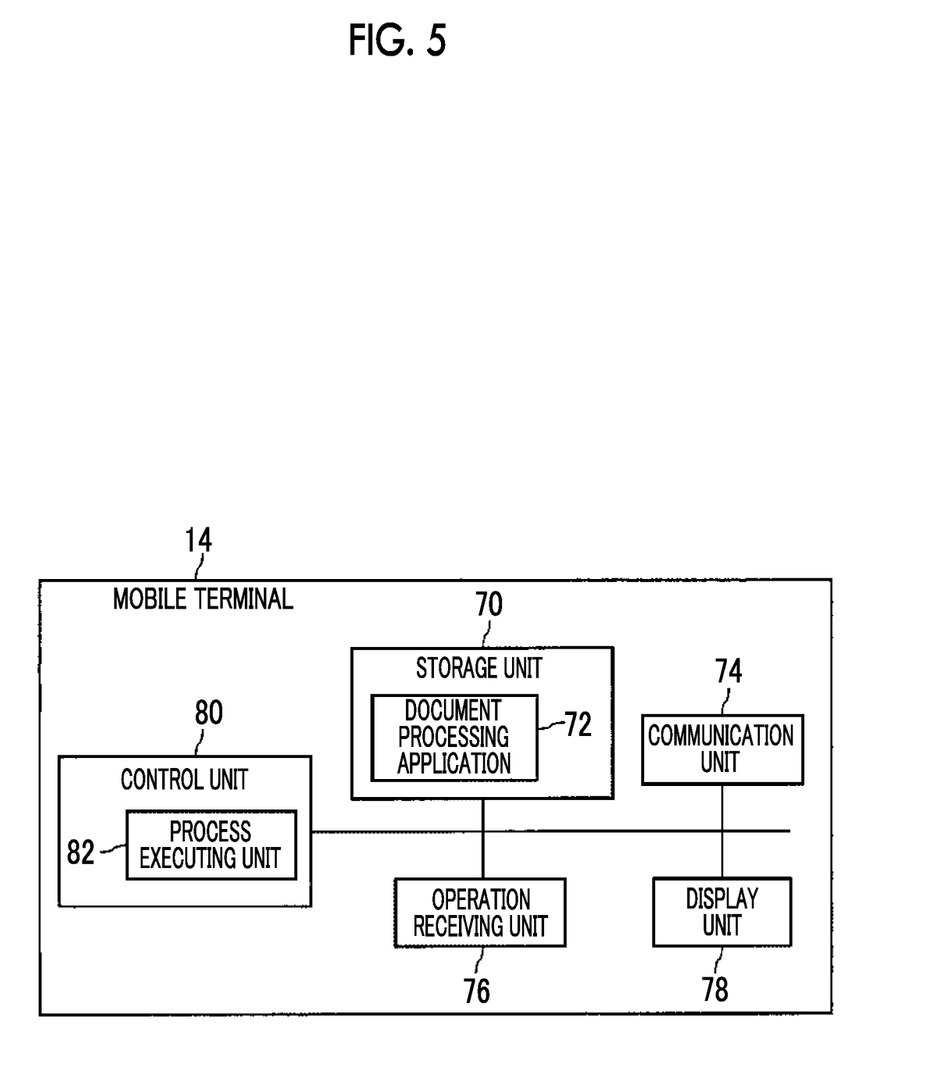
FIG. 5 is a schematic diagram illustrating a configuration of the mobile terminal.

FIG. 5 is a schematic diagram illustrating a configuration of the mobile terminal 14.

A storage unit 70 is configured to include, for example, ROM, RAM, or the like. The storage unit 70 stores the electronic document as a processing target, the processing result in the mobile terminal 14, and the like. In addition, a same document processing application 72 as the document processing application 22 installed in the PC 12, is installed in the mobile terminal 14 and therefore the document processing application 72 is stored in the storage unit 70. Hereinafter, the document processing application executed in the PC 12 is described as the document processing application 22 and the document processing application executed in the mobile terminal 14 is described as the document processing application 72 by using separate reference marks. Further, the storage unit 70 stores the document processing program for executing the document processing application 72 and operating each of units of the mobile terminal 14.

A communication unit 74 is configured to include, for example, a network adapter, a Lightning interface, a USB interface, a Bluetooth interface, or the like. The communication unit 74 functions to communicate with the PC 12 and the server 16 via the communication line 18. Alternately, the communication unit 74 functions as an interface for directly connecting with the PC 12. Accordingly, for example, it is possible to receive the electronic document or the like from the server 16 or the PC 12.

An operation receiving unit 76 is configured to include, for example, a touch panel or the like. The operation receiving unit 76 receives an operation for inputting a command from the user to the mobile terminal 14, particularly, a command to the document processing application 72.

A display unit 78 as a second display unit is configured to include, for example, a liquid crystal panel. The display unit 78 displays various screens, particularly, a display screen of the document processing application 72. A screen size of the display unit 78 is smaller than a screen size of the display unit 28 of the PC 12.

A control unit 80 is configured to include, for example, a CPU or the like. The control unit 80 controls each of the units of the mobile terminal 14 according to the program stored in the storage unit 70. In addition, by executing the installed document processing application 72, the control unit 80 functions as a process executing unit 82.

The process executing unit 82 performs a process of executing the document processing application 72. Specifically, the process executing unit 82 performs a process of causing the display unit 78 to display a display screen (hereinafter, simply referred to as "display screen of mobile terminal 14") of the document processing application 72. In this way, the process executing unit 82 also functions as a second display control unit. Particularly, the process executing unit 82 displays the selection annotation attachment button, to which the attachment command of the selection annotation described above is assigned, on the display screen of the mobile terminal 14. Details of a process of displaying of the selection annotation attachment button will be described below.

In addition, the process executing unit 82 executes each of functions which may be executed by the document processing application 72 according to an operation of the user received by the operation receiving unit 76. Particularly, the process executing unit 32 executes a process of attaching the annotation, which the document processing application 72 may attach, to the electronic document to be processed. In this way, the process executing unit 82 also functions as a second object attachment unit.

Hereinafter, details of the document processing application 72 and details of the process of displaying the selection annotation attachment button executed by the process executing unit 82 will be described.

Figure 6:
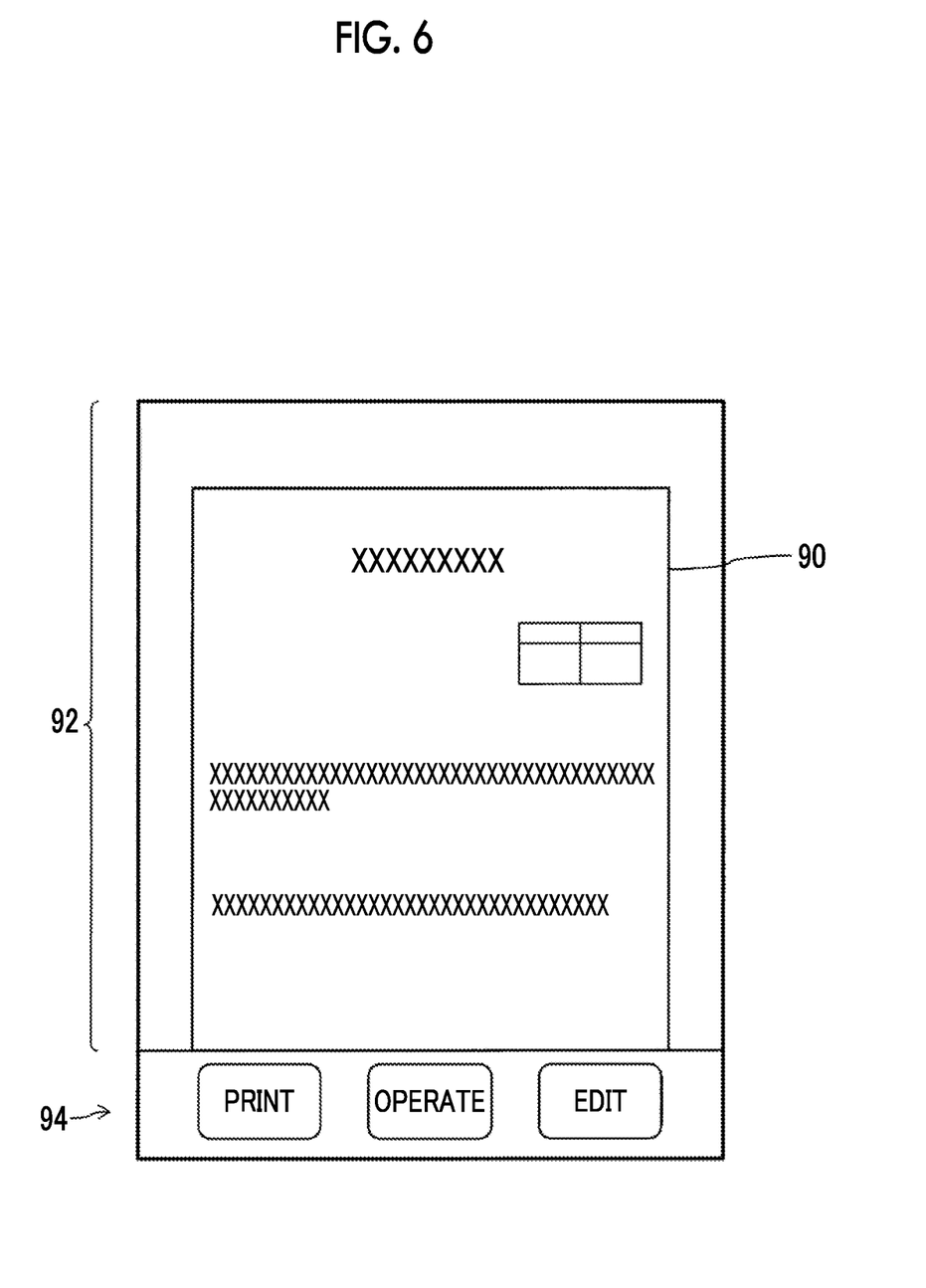
FIG. 6 is a diagram illustrating an example of a display screen of a document processing application displayed on a display unit of the mobile terminal.

FIG. 6 is a diagram illustrating an example of the display screen of the mobile terminal 14. The display screen of the mobile terminal 14 is configured to include a document display area 92 on which an electronic document 90 to be processed is displayed and a menu bar 94.

The electronic document 90 displayed on the document display area 92 may be an electronic document transmitted from the PC 12 to the server 16. In this case, the user accesses the server 16 by using the mobile terminal 14 to perform the user authentication. In addition, the desired electronic document 90 stored in the server 16 is downloaded to the mobile terminal 14. At this time, the selection annotation information corresponding to the user is downloaded together. Further, the electronic document 90 displayed on the document display area 92 may be an electronic document directly received from the PC 12. In this case, the mobile terminal 14 receives the desired electronic document 90 stored in the storage unit 20 of the PC 12. At this time, the selection annotation information corresponding to the user is received together from the PC 12.

Figure 7:
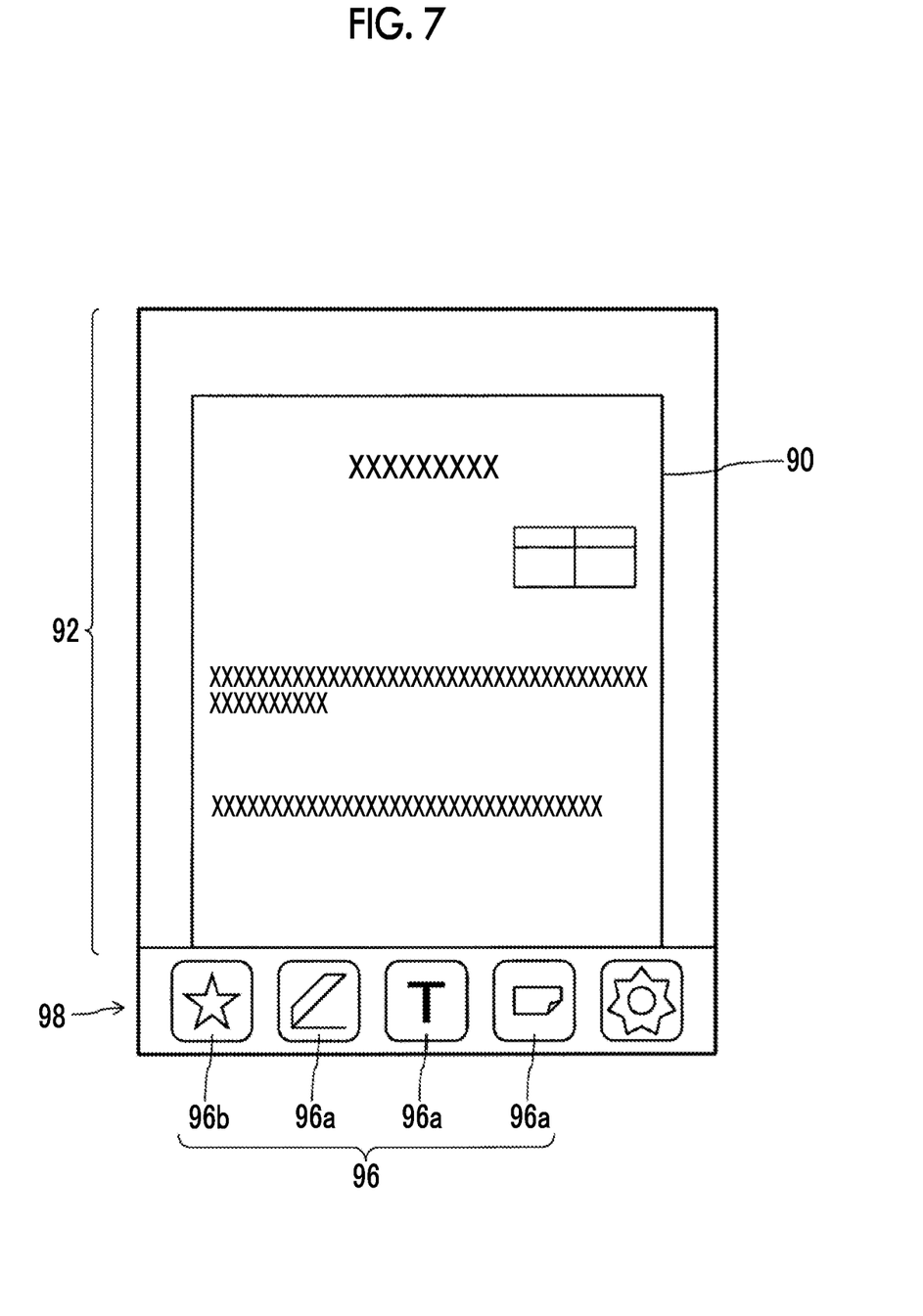
FIG. 7 is a diagram illustrating a display example of a menu bar in a case of selecting a major item of "edit"

The menu bar 94 includes the buttons corresponding to the major items such as "print", "operate", "edit", and the like. In a case of selecting each of the major items (realized by, for example, tabbing button), a new bar including a plurality of buttons, to which the commands included in the selected major item are respectively assigned, is displayed at a position at which the menu bar 94 is displayed. FIG. 7 illustrates a state in which in a case of selecting the major item of "edit", instead of the menu bar 94, an editing bar 98 including a plurality of buttons 96, to which the commands included in the major item of "edit" are respectively assigned, is displayed. The editing bar 98 may include an annotation attachment button 96a, to which the command for attaching the annotation to the electronic document 90 is assigned.

Figure 8:
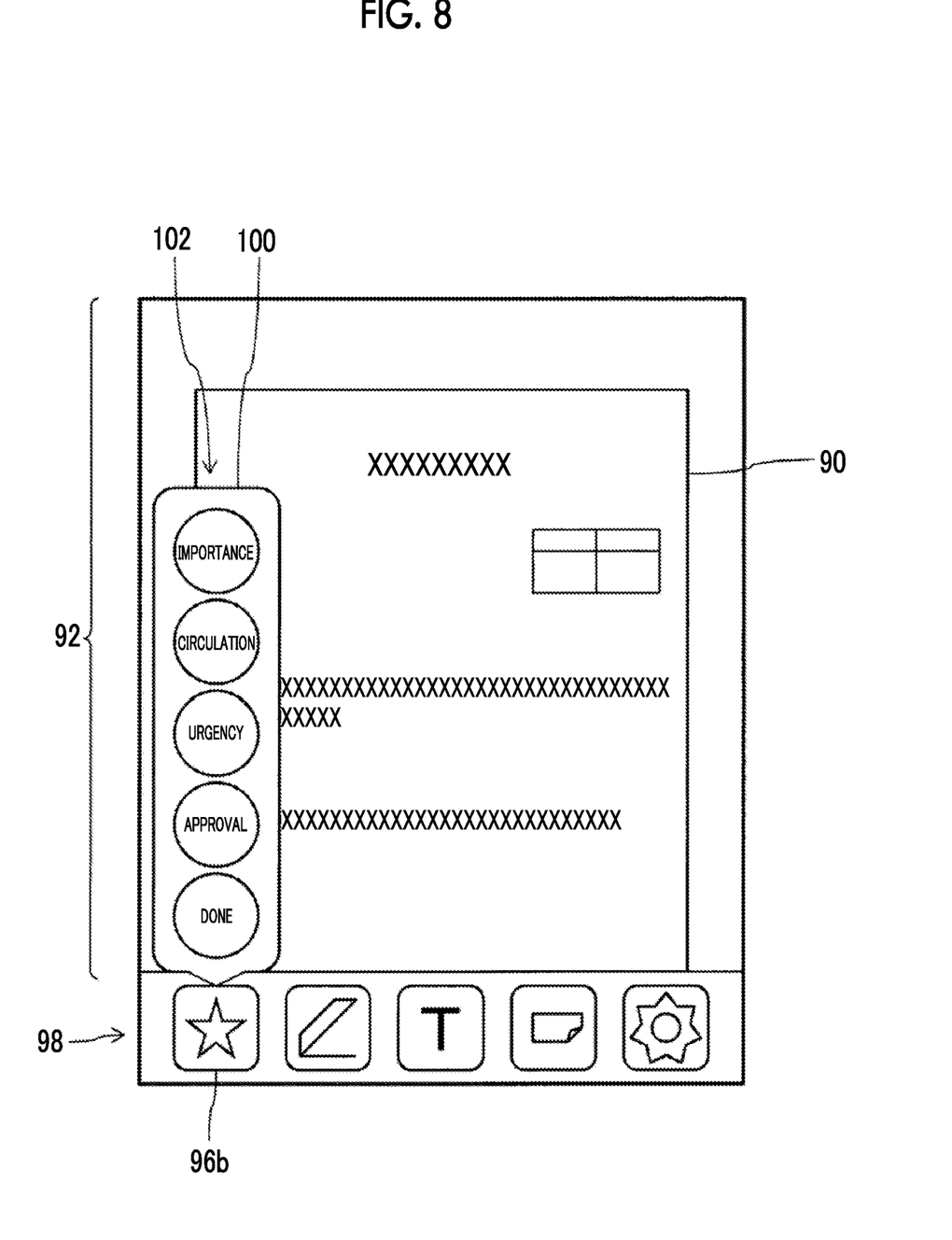
FIG. 8 is a diagram illustrating an example of displaying the selection object attachment button on the display unit of the mobile terminal.

FIG. 8 is a diagram illustrating an example of displaying a selection annotation attachment button 100 on the display screen of the mobile terminal 14. In a case where the screen size of the display unit 78 of the mobile terminal 14 is smaller than the screen size of the display unit 28 of the PC 12, further in a case where the user selects one button 96b among the plurality of buttons 96 included in the editing bar 98, the process executing unit 82 displays one or a plurality of selection annotation attachment buttons 100, to which the attachment command of the selection annotation described above selected by the user is assigned, on the display screen of the mobile terminal 14 based on the selection annotation information corresponding to the user directly received from the server 16 or the PC 12.

As a method of comparing the screen size of the display unit 28 of the PC 12 and the screen size of the display unit 78 of the mobile terminal 14, the following method may be adopted. For example, a size list of a monitor in association with a screen size of the monitor currently circulated or circulated in the past is stored in the server 16. In a case where the electronic document is transmitted from the PC 12 to the server 16, monitor identification information for identifying the display unit 28 (monitor) of the PC 12 is transmitted together.

In addition, in a case of downloading the electronic document stored in the server 16, the process executing unit 82 may use a method of specifying a size of the display unit 28 and comparing the size of the display unit 28 with the screen size of the display unit 78 of the mobile terminal 14 based on the size list of the monitor stored in the server 16 and the monitor identification information related to the PC 12 which transmits the electronic document to the server 16.

By the PC 12 directly communicating with the mobile terminal 14, in a case where the electronic document is transmitted from the PC 12 to the mobile terminal 14, further in a case where the PC 12 and the mobile terminal 14 are connected with each other, information indicating the screen size of the display unit 28 of the PC 12 is transmitted to the mobile terminal 14. The process executing unit 82 specifies the size of the display unit 28 according to the information and compares the size of the display unit 28 with the screen size of the display unit 78 of the mobile terminal 14.

In the present exemplary embodiment, the process executing unit 82 displays the selection annotation attachment button 100 on the document display area 92. By displaying the selection annotation attachment button 100 on the document display area 92, the user may perform the annotation attachment process with the simpler operation.

As described above, in the present exemplary embodiment, the user selects the category of some annotations among the categories of the plurality of annotations corresponding to the plurality of tool boxes 54 displayed on the display screen of the PC 12. That is, the user selects some of the tool boxes 54 among the plurality of tool boxes 54 displayed on the display screen of the PC 12. Therefore, in the present exemplary embodiment, a tool box 102 having the same contents as some tool boxes among the plurality of tool boxes 54 displayed on the display screen of the PC 12, is displayed on the display screen of the mobile terminal 14. In the example in FIG. 8, the tool box 102 having the same contents as the tool box 54 of the stamp annotation among the tool box 54 of the basic annotation, the tool box 54 of the stamp annotation, and the tool box 54 of the figure annotation displayed on the display screen of the PC 12, is displayed on the display screen of the mobile terminal 14.

In a case where the selection annotation is set for each type of the electronic documents and the selection annotation information indicates a combination of the type of the electronic document and the selection annotation, the process executing unit 82 displays the selection annotation attachment button 100, to which the attachment command of the selection annotation according to a type of the electronic document 90 is assigned, in a case where the user selects the button 96*b*.

As a method of determining the type of the electronic document 90, the following method may be adopted. For example, a method of determining the type of the electronic document 90 based on a file name of the electronic document 90, may be used. For example, in a case where a text such as "drawing" or "diagram" is included in the file name of the electronic document 90, it may be determined that the type of the electronic document 90 is a diagram. Alternately, a method of managing the electronic document by the server 16 or the PC 12 distinguishing between the types of the electronic documents, may be used. For example, the server 16 or the PC 12 prepares a plurality of folders in advance according to each of the types of the electronic documents and stores the electronic document in the folder according to the type of the electronic document. In addition, the process executing unit 82 of the mobile terminal 14 may determine the type of the electronic document based on a download source (folder) of the electronic document 90.

In addition, in a case where the selection annotation is individually set for each of the electronic documents and the selection annotation information indicates a combination of the identification information of the electronic document and the selection annotation, the process executing unit 82 displays the selection annotation attachment button 100, to which the attachment command of the selection annotation according to the electronic document 90 is assigned, based on the identification information of the electronic document included in the selection annotation information in a case where the user selects the button 96*b*.

Without being limited to the case where the button 96*b* is selected, such as a case where the electronic document 90 is displayed or a case where a button of "edit" of the menu bar 94 of is selected, the selection annotation attachment button 100 may be displayed at any timing. In addition, in the case where the electronic document 90 is displayed, the selection annotation attachment button 100 may be displayed all the time or the type of the electronic document 90 to be displayed may be switched and the selection annotation attachment button 100 in association with the type of the electronic document may be switched and displayed.

As described above, in the first exemplary embodiment, in the case where the screen size of the display unit 78 of the mobile terminal 14 is smaller than the screen size of the display unit 28 of the PC 12, the selection annotation attachment button 100, to which the attachment command of some annotations of the annotations corresponding to the plurality of annotation attachment buttons 52*a* displayed on the display screen of the PC 12 is assigned, is displayed. In the present exemplary embodiment, the toolbox 102 having the same contents as some tool boxes among the plurality of tool boxes 54 displayed on the display screen of the PC 12, is displayed on the display screen of the mobile terminal 14. Accordingly, since compression of the document display area is suppressed or the area in which the tool box 102 overlaps with the document display area 92 becomes smaller on the display screen of the mobile terminal 14, it is possible to prevent deterioration of visibility of the electronic document 90. Further, since the annotation corresponding to the selection annotation attachment button 100 is an annotation selected by the user, it is possible to display the selection annotation attachment button 100 corresponding to the annotation frequently used by the user, on the display screen of the mobile terminal 14.

In the present exemplary embodiment, only the PC 12 includes the function of the annotation selecting unit 34, but the mobile terminal 14 may include the annotation selecting unit 34. That is, the user may select the selection annotation in the mobile terminal 14. In this case, the selection window 60 (see FIG. 4) is displayed on the display screen of the mobile terminal 14 and an annotation selecting unit of the mobile terminal 14 selects the selection annotation according to the instruction of the user on the selection window 60.

Second Exemplary Embodiment

Configurations of the document processing system 10, the PC 12, and the mobile terminal 14 according to the second exemplary embodiment are the same as the first exemplary embodiment. In addition, the display screen of the PC 12 and the display screen of the mobile terminal 14 also have the same configurations as the first exemplary embodiment. Therefore, the second exemplary embodiment will be described with reference to FIGS. 1 to 8 used in the description of the first exemplary embodiment. The same descriptions of the second exemplary embodiment as the first exemplary embodiment will be omitted.

In the first exemplary embodiment, the screen size of the display unit 78 of the mobile terminal 14 is smaller than the screen size of the display unit 28 of the PC 12, but in the second exemplary embodiment, the screen size of the display unit 78 of the mobile terminal 14 does not need to be smaller than the screen size of the display unit 28 of the PC 12. On the other hand, according to the second exemplary embodiment, in the document processing application 72, the process executing unit 82 of the mobile terminal 14 may attach some types of annotations among the plural types of annotations attachable by the process executing unit 32 of the PC 12 in the document processing application 22, to the electronic document to be processed. That is, the function of the document processing application 72 is limited to the document processing application 22 and the number of types of the annotations attachable to the electronic document is smaller than the document processing application 22.

The function of the document processing application 72 is limited due to a difference between an OS of the PC 12 and an OS of the mobile terminal 14. In the present exemplary embodiment, the OS of the PC 12 is Windows (registered trademark) or macOS (registered trademark) and the document processing application 22 operating on the OS may be executed without the function being limited. On the other hand, the OS of the mobile terminal 14 is Android (registered trademark) or iOS (registered trademark) and some functions of the document processing application 72 operating on the OS are limited. Specifically, the types of the annotations attachable to the electronic document are limited.

Even in the second exemplary embodiment, the PC 12 is used as the first device and the mobile terminal 14 is used as the second device, but another device may be used as the first device or the second device. In the second exemplary embodiment, the first device and the second device may execute the document processing application and as long as the types of the annotations which may be attached by the document processing application operating on the second device is smaller than the types of the annotations which may be attached by the document processing application operating on the first device, it is possible to use various devices.

The process of displaying the selection annotation attachment button 100 by the process executing unit 82 according to the second exemplary embodiment will be described with reference to FIG. 8. In the second exemplary embodiment, in a case where the types of the annotations, which may be attached by the document processing application 72, are limited due to the OS of the mobile terminal 14, for example, a case where the OS of the mobile terminal 14 is Android or iOS, the process executing unit 82 executes the following process.

In the case where the user selects the button 96b, the process executing unit 82 refers the selection annotation information corresponding to the user received from the server 16 or the PC 12 and specifies the selection annotation selected by the user. Further, the process executing unit 82 omits the annotation, which may not be attached to the electronic document 90 in the document processing application 72, from the selection annotations and displays one or the plurality of selection annotation attachment buttons 100 to which the attachment commands of one or a plurality of remaining selection annotations are assigned.

In the second exemplary embodiment, the user selects the category of some annotations among the plurality of annotations corresponding to the plurality of tool boxes 54 displayed on the display screen of the PC 12. That is, the user selects some of the tool boxes 54 among the plurality of tool boxes 54 displayed on the display screen of the PC 12. Therefore, in the second exemplary embodiment, among the annotations corresponding to the annotation attachment buttons 52a included in some tool boxes among the plurality of tool boxes 54 displayed on the display screen of the PC 12, the tool box 102 including the selection annotation attachment button 100, to which the attachment command of the annotation attachable in the document processing application 72 is assigned, is displayed on the display screen of the mobile terminal 14.

Without being limited to the case where the button 96b is selected, such as a case where the electronic document 90 is displayed or a case where the button of "edit" of the menu bar 94 is selected, the selection annotation attachment button 100 may be displayed at any timing. In addition, in a case of displaying the electronic document 90, the electronic document 90 also may be displayed all the time.

In the second exemplary embodiment, the process executing unit 82 selects the annotation attachable in the document processing application 72 among the selection annotations selected by the user, but in the selection window 60 (see FIG. 4) displayed on the display screen of the PC 12 or the display screen of the mobile terminal 14, only the annotations attachable in the document processing application 72 may be displayed as selection candidates from the beginning.

As described above, in the second exemplary embodiment, in a case where the annotation attachable to the electronic document 90 is limited in the document processing application 72, the selection annotation attachment button 100 to which the attachment commands of the annotations, which are some annotations of the annotations corresponding to the plurality of annotation attachment buttons 52a displayed on the display screen of the PC 12, attachable in the document processing application 72 are assigned is displayed. That is, since the button, to which the attachment command of the annotation which may not be attached in the document processing application 72 is assigned, is not displayed, the user is not confused. Further, since the annotation corresponding to the selection annotation attachment button 100 is an annotation selected by the user, it is possible to display the selection annotation attachment button 100 corresponding to the annotation frequently used by the user, on the display screen of the mobile terminal 14.

Although the exemplary embodiments of the invention are described, the exemplary embodiments of the invention are not limited thereto and various modifications can be made without departing from a gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing system comprising:
   a first device is connected with a second device;
   the first device capable of executing a document processing application, the first device including
   a first processor configured to:
   control a first display unit of the first device to display an electronic document to be processed and a plurality of object attachment buttons, to which attachment commands of a plurality of types of objects attachable to the electronic document are respectively assigned, in the document processing application;

display a graphical user interface (GUI) on the electronic document, wherein the GUI comprises the plurality types of objects for selection: and receive a selection operation performed by a user to select an object from the plurality of types of objects displayed on the GUI corresponding to the plurality of object attachment buttons and assign the selected object as a selection object attachment button to be displayed on a second display unit of the second device, and the second device capable of executing the document processing application, the second device including a second processor configured to:

control the second display unit of the second device to display the electronic document to be processed and to together display the selection object attachment button to which an attachment command of the selection object is assigned, wherein the second display unit of the second display device has a size smaller than a size of the first display unit of the first device.

2. The document processing system according to claim 1, wherein the second processor displays the selection object attachment button in a document display area on which the electronic document to be processed is displayed.

3. The document processing system according to claim 1, wherein the second processor displays the selection object attachment button according to a type of the electronic document to be processed.

4. The document processing system according to claim 1, wherein the plurality of object attachment buttons are a plurality of annotation attachment buttons, wherein the plurality of types of objects are a plurality of types of annotations corresponding to the plurality of annotation attachment buttons, wherein the selection object is a selection annotation selected from the plurality of types of annotations by the user through the first device, and wherein the second processor of the second device controls the second display unit to display a selection annotation attachment button to which the selection annotation is assigned.

5. The document processing system according to claim 4, wherein the plurality types of annotations comprise a basic annotation, a stamp annotation, and a figure annotation.

6. The document processing system according to claim 4, wherein the plurality types of annotations comprise an annotation which the user recently uses in the document processing application.

7. A non-transitory computer readable medium storing a document processing program, that when executed by a computer, causes the computer to:

connect with another device;

execute a document processing application executed by the another device, wherein the another device including a first processor, wherein the first processor controls a first display unit of the another device to display an electronic document to be processed and a plurality of object attachment buttons to which attachment commands of a plurality of types of objects attachable to the electronic document are respectively assigned, the first processor displays a graphical user interface (GUI) on the electronic document, wherein the GUI comprises the plurality types of objects for selection, and the first processor receives a selection operation performed by a user to select an object from the plurality of types of objects displayed on the GUI corresponding to the plurality of object attachment buttons and assigns the selected object as a selection object attachment button to be displayed on a second display unit of the computer;

control the second display unit of the computer to display the electronic document to be processed and to together display the selection object attachment button to which an attachment command of the selection object is assigned, wherein the second display unit of the computer has a size smaller than a size of the first display unit of the another device.

8. A non-transitory computer readable medium storing a document processing program, that when executed by a computer, causes the computer to:

connect with another device;

execute a document processing application executed by the another device, the another device including a first processor, wherein the first processor attaches a plurality of types of objects to an electronic document to be processed and controls a first display unit of the another device to display a plurality of object attachment buttons to which attachment commands of the plurality of types of objects are respectively assigned, wherein the first processor displays a graphical user interface (GUI) on the electronic document, wherein the GUI comprises the plurality types of objects for selection, and wherein the first processor receives a selection operation performed by a user to select an object from the plurality of types of objects displayed on the GUI corresponding to the plurality of object attachment buttons and assigns the selected object as a selection object attachment button to be displayed on a second display unit of the computer;

attach some types of the objects among the plurality of types of objects attachable by the first processor of the another device, to the electronic document to be processed; and control the second display unit of the computer to display the electronic document to be processed and to together display the selection object attachment button which an attachment command of the selection object is assigned.

* * * * *